(12) United States Patent
Zhanel

(10) Patent No.: US 10,384,564 B1
(45) Date of Patent: Aug. 20, 2019

(54) ELECTRONIC SEAT PAD SYSTEM FOR INDICATING CHILD OCCUPANCY IN A VEHICLE

(71) Applicant: Larry Zhanel, Ennis, TX (US)

(72) Inventor: Larry Zhanel, Ennis, TX (US)

( * ) Notice: Subject to any disclaimer, the term of this patent is extended or adjusted under 35 U.S.C. 154(b) by 0 days.

(21) Appl. No.: 16/123,268

(22) Filed: Sep. 6, 2018

(51) Int. Cl.
| | |
|---|---|
| B60N 2/00 | (2006.01) |
| G08B 21/22 | (2006.01) |
| G01G 19/414 | (2006.01) |
| B60N 2/26 | (2006.01) |

(52) U.S. Cl.
CPC ............. *B60N 2/002* (2013.01); *G08B 21/22* (2013.01); *B60N 2/26* (2013.01); *G01G 19/414* (2013.01)

(58) Field of Classification Search
CPC .......... B60N 2/002; B60N 2/26; G08B 21/22; G01G 19/414
See application file for complete search history.

(56) References Cited

U.S. PATENT DOCUMENTS

| | | | | |
|---|---|---|---|---|
| 5,260,684 | A * | 11/1993 | Metzmaker | B60N 2/002 340/425.5 |
| 6,489,889 | B1 * | 12/2002 | Smith | B60N 2/002 180/271 |
| 7,123,157 | B2 | 10/2006 | Best | |
| 7,378,979 | B2 * | 5/2008 | Rams, Jr. | B60N 2/002 180/271 |
| 8,063,788 | B1 * | 11/2011 | Morningstar | B60N 2/002 180/271 |
| 10,068,452 | B1 * | 9/2018 | Nunez | G08B 21/0205 |
| 2006/0149430 | A1 * | 7/2006 | Slaton | A45C 3/02 701/1 |
| 2006/0208911 | A1 * | 9/2006 | Davis | B60N 2/002 340/573.4 |
| 2007/0132571 | A1 * | 6/2007 | Rossi | B60N 2/002 340/457 |
| 2009/0040036 | A1 * | 2/2009 | Talis | B60N 2/002 340/457.1 |
| 2011/0080288 | A1 * | 4/2011 | Younse | B60N 2/002 340/573.1 |
| 2017/0101055 | A1 * | 4/2017 | Alfaro Fonseca | B60N 2/002 |

\* cited by examiner

*Primary Examiner* — Munear T Akki
(74) *Attorney, Agent, or Firm* — Sanchelima & Associates, P.A.; Christian Sanchelima; Jesus Sanchelima

(57) ABSTRACT

The present invention is an electronic seat pad system that includes an electronic seat pad device and a control device. Electronic seat pad device includes one or more sensors that detect a pressure level exerted on a carseat in a vehicle when an occupant is seated on said carseat, wherein electronic seat pad is positioned on top of a bottom cushion of carseat. A switch circuit is activated upon detecting a pressure level exerted on a seat of a vehicle upon said detection of said pressure level. Control device, communicably coupled with said switch circuit, generates audio signals upon said activation of said switch circuit indicating presence of said occupant in said vehicle.

9 Claims, 2 Drawing Sheets

ELECTRONIC SEAT PAD SYSTEM FOR INDICATING CHILD OCCUPANCY IN A VEHICLE

BACKGROUND OF THE INVENTION

1. Field of the Invention

The present disclosure relates to an electronic seat pad system. More particularly, the present disclosure relates to an electronic seat pad system for indicating child occupancy in a vehicle.

2. Description of the Related Art

Many unfortunate incidents, as in death of infants or young children, happen when attendants leave their infants or young children inside parked cars due to the carelessness and negligence or sheer forgetfulness during hot weather conditions. The grief and heartbreak of losing their child may wreak havoc in the lives of family members.

Several designs for electronic seat pad system have been presented in the past. None of them, however, presents a simple and inexpensive electronic seat pad system that is user friendly, easy to install, and lifesaving and can easily be moved from carseat to carseat and/or from vehicle to vehicle.

Applicant believes that a related reference corresponds to a patent number U.S. Pat. No. 7,123,157B2 filed by Best. Best reference discloses that if an infant or child placed in a child's car-seat in a motor vehicle, any rising of the driver from the driver's seat after the control apparatus has been energized, provides an alarm to alert the driver of leaving the infant or child unattended in the vehicle. However, the alarm system disclosed by Best does require a trigger implemented at the driver's seat.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide an electronic seat pad system, comprising of a switch circuit configured to be activated upon detecting a pressure level exerted on a carseat in a vehicle when an occupant is seated on carseat. Electronic seat pad is positioned on top of a bottom cushion of carseat. Electronic seat pad system further comprises of a control device, communicably coupled with switch circuit, configured to generate audio signals upon activation of switch circuit indicating presence of occupant in vehicle.

Control device is secured at a first location, such as back side of a front seat, using a securing mechanism. Securing mechanism may comprise of straps and buckle. Control device remains activated at all timestamps even when vehicle engine turns off, and resultantly radio system and air conditioning system is deactivated in vehicle. Control device has a low battery indicator beeper which activates when battery level of control device is less than a threshold power level.

Electronic seat pad system further comprises of a hole located at a front portion of electronic seat pad device through which a front single middle part of a seat buckle of back carseat engages with a receiving part located at a front base of carseat. Engagement of front single middle part of seat buckle of carseat with receiving part located at front base of carseat through hole secures electronic seat pad device on the top of the bottom cushion of carseat.

In various embodiments, communicable coupling between electronic seat pad device and control device is based on a wired network or a wireless network. Switch circuit may be deactivated when back seat is vacated by occupant in vehicle. In an embodiment, carseat occupied by occupant may in a back seat or a front seat of vehicle and occupant in vehicle may be an infant, a toddler, a young child, or an occupant who needs supervision. Electronic seat pad system may further comprise of one or more audio output devices configured to generate enhanced audio signals based on generated audio signals. One or more audio output devices may be located at a second location in vehicle and communicably coupled to control device based on a wired network or a wireless network Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
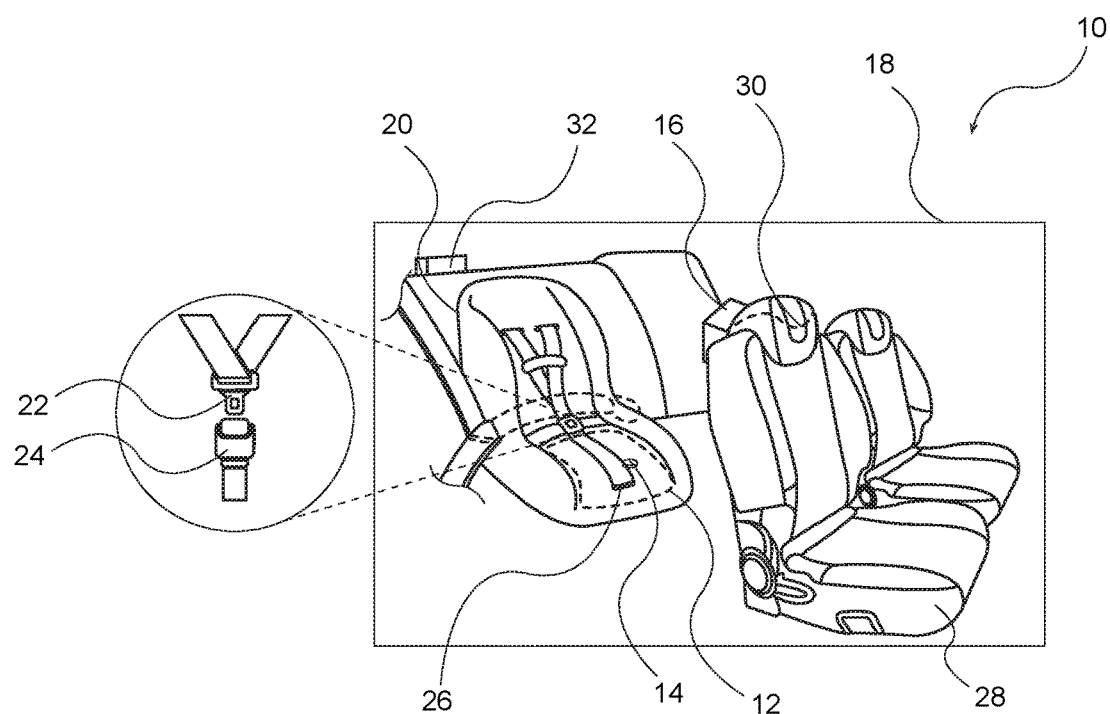
FIG. 1 represents an electronic seat pad system 10 of present invention in its operating environment, according to an embodiment described herein.

Referring now to the drawings, FIGS. 1-3, where the present invention is generally referred to with numeral 10, it can be observed that an electronic seat pad system, in accordance with one embodiment, is provided that includes various components, a described hereinafter.

Figure 2:
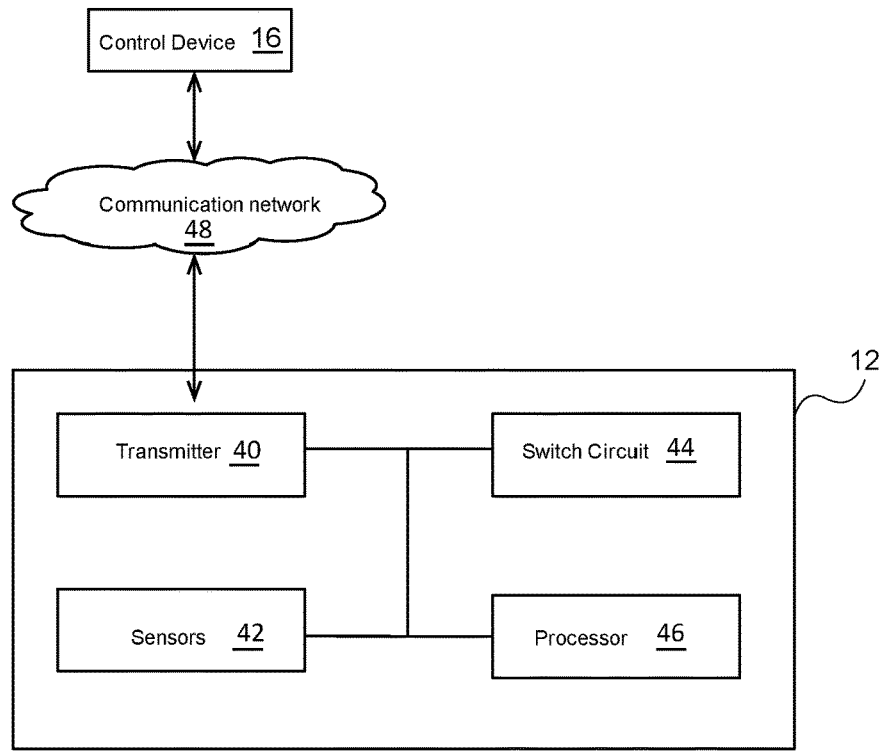
FIG. 2 demonstrates a block diagram of electronic seat pad system 10, according to various embodiments described herein.

FIG. 1 illustrates electronic seat pad system 10 of the present invention in its operating environment, which further includes an electronic seat pad device 12, comprising of a switch circuit 14 and sensors (as shown in FIG. 2) communicably coupled to a control device 16 located at a first location, such as back side of a front seat 28, via communication network (as shown in FIG. 2) in a vehicle 18. There is further shown an audio device, such as an audio speaker 32, located at a second location, such as near carseat 20 which is the back seat of vehicle 18, and communicably coupled to control device 16 in vehicle 18. Optionally, audio speaker 32 can be located on control device 16.

In an embodiment, electronic seat pad device 12 is placed on top of the bottom cushion of the carseat 20 in vehicle 18 on which a child sits. It may be ascertained that there are not present any foreign objects in the bottom of carseat 20 in which electronic seat pad device 12 is placed. Electronic seat pad device 12 is placed on the top of the bottom cushion of the carseat 20 in such a manner that pad part of electronic seat pad device 12 and maximum pressure is exerted on electronic seat pad device 12 when occupant (not shown) is seated on carseat 20. When occupant is seated on carseat 20, a front single middle part 22 of a seat buckle of carseat 20 engages with a receiving part 24 located at a front base of carseat 20 through a hole 26 provided in front portion of electronic seat pad device 12. In this manner, occupant is safely seated on carseat 20 and hole 26 facilitates for securing electronic seat pad device 12 on the top of the bottom cushion of carseat 20.

Switch circuit 14 in electronic seat pad device 12 may be activated when carseat 20 is occupied by occupant in vehicle 18 thereby exerting pressure on electronic seat pad device 12. Switch circuit 14 may be deactivated when carseat 20 is vacated by occupant in vehicle 18. Carseat 20 occupied by occupant may be in a back seat or front seat of the vehicle 18. Occupant in vehicle 18 may be a child.

In an embodiment, thickness of electronic seat pad device 12 may be "2 inches", length may be "9 inches", and width may be "8-9 inches". In an example use case, shape of electronic seat pad device 12 may be rectangular. In other example use cases, shape of electronic seat pad device 12 may be oval, trapezoidal, or the like. Material used may be a cloth fabric, vinyl, and foam rubber.

Control device 16 may include various circuitries, such as amplifiers, active noise controllers, analog-to-digital converters, and/or the like, to generate audio signals. Control device 16 may be communicative coupled to electronic seat pad device 12 via a wired network or a wireless network (not shown). Control device 16 may be secured, for example on a back side of a front seat 28, using a securing mechanism 30. As shown in FIG. 1, securing mechanism 30 may comprise of straps and buckle. According to present disclosure, control device remains activated at all timestamps even when engine of vehicle 18 turns off, and also radio system and air conditioning system deactivates in vehicle 18 when engine of vehicle 18 turns off. Control device 16 has a low battery indicator beeper which activates when battery level of control device 16 is less than a threshold power level. In an example embodiment, control device 16 may be a rectangular box with dimensions "4 inches"×"9 inches"×"3 inches". Control device 16 remains activated at all timestamps even when vehicle engine turns off and radio system and air conditioning system are deactivated in vehicle 18. Control device 16 does not have an on/off button but merely a volume control knob so that audio signals generated by control device 16 can always be heard by attendee of occupant.

Electronic seat pad system 10 may further comprise of one or more audio output devices, such as an audio speaker 32, configured to generate enhanced audio signals based on audio signals generated by control device 16. Thus, in an embodiment, audio speaker 32 may generate enhanced audio signals that are amplified audio signals with improved sound quality. One or more audio output devices, such as an audio speaker 32, are communicably coupled between electronic seat pad device 12 and control device 16 based on a wired network or a wireless network.

In various embodiments, electronic seat pad device 12 may be powered by 12 Volts by means of a male plug that plugs into a charging port (not shown) in vehicle 18 or cigarette lighter port (not shown) and a wire that connects male plug to control device 16. The male plug may include a colored light indicator, such as Blue, Green, or Red, that may indicate a good connection of electronic seat pad device 12 and that electronic seat pad device 12 is sufficiently powered. In an embodiment, one or more circuits in electronic seat pad device 12 may generate an alert signal, such as a beep or an alarm, in an event when male plug is accidently pulled out of charging port or power is lost to the device by some other means.

FIG. 2 demonstrates a block diagram of electronic seat pad device 12, according to various embodiments described herein. Transmitter 40 may be configured to transmit signals and alerts to other devices, such as control device 16 or a portable device, via communication network 48. In such case, electronic seat pad device 12 is synchronized with one or more applications executing in other devices (e.g., control device 16 or portable device, such as a mobile phone, carried by an attendant of occupant). Such one or more applications provide an alert to attendant to perform suitable action, such as removing occupant from vehicle 18.

Sensors 42, such as pressure or weight sensors, may be configured to detect pressure level when pressure is exerted on electronic seat pad device 12 when occupant is seated on carseat 20.

Switch circuit 44 may be a circuitry that may be activated once pressure level exceeds a threshold pressure level. Once pressure level exceeds threshold pressure level and switch circuit 44 is activated, processor 46 may be configured to generate activation signals for control device 16. Transmitter 40 may then transmit generated activation signals to control device 16 via communication network 48. In an embodiment, communication network 48 may be a wireless network, such as Bluetooth® network. In other embodiment, communication network 48 may be a wired network. Accordingly, control device 16 may be configured to generate audio signals, such as a song or live commentary, which may be played by an integrated audio player installed within. Control device 16 uses a battery that may be a lithium-ion battery that is small, durable, and long life that may be configured to power up circuitry of control device 16. Alternatively; control device 16 uses a chargeable battery that may be recharged when battery level drops below a threshold power level. On the contrary, switch circuit 44 may be de-activated once pressure level becomes lower than threshold pressure level, i.e. occupant is removed from vehicle 18.

In an embodiment, processor 46 may determine that audio player in control device 16 continues playing audio signals for specific time duration, e.g. 2 minutes, even after vehicle engine is turned off, and of radio system and air conditioning system are deactivated in vehicle 18. In such case, processor 46 may generate an alert notification for portable device, such as a mobile phone, carried by attendant of occupant, to check for occupant in vehicle 18. Such generated alert notifications are rendered by the I/O devices, such as flash light, display screen, beeper, and/or the like of portable devices.

Figure 3:
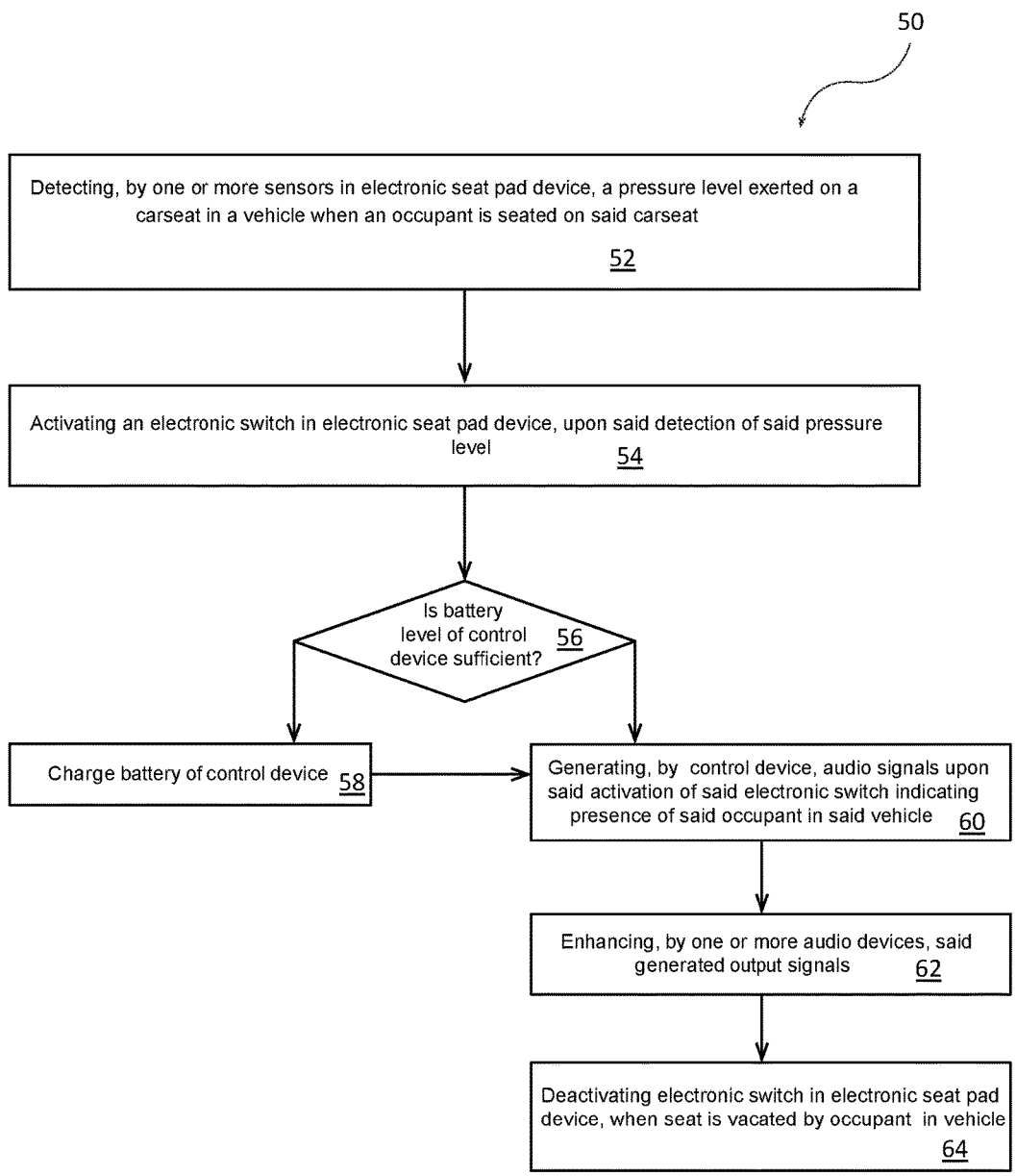
FIG. 3 is a flowchart for illustrating a method for indicating child occupancy in a vehicle by an electronic seat pad system 10, according to an embodiment described herein.

FIG. 3 is a flowchart 50 for illustrating a method for indicating child occupancy in a vehicle by an electronic seat pad system 10, according to an embodiment described herein. At step 52, one or more sensors 42 in electronic seat pad device 12 may be configured to detect a pressure level exerted on carseat 20 in a vehicle 18. Pressure level may be exerted when occupant is seated on the top of the bottom cushion of carseat 20. In certain embodiments, one or more sensors 42 in electronic seat pad device 12 may be configured to detect a pressure level exerted directly on electronic seat pad device 12 fastened on a back seat or front seat of vehicle 18. In such cases, pressure level may be exerted when occupant is seated on the back seat or front seat of vehicle 18.

In an embodiment, carseat 20, on which electronic seat pad system 10 is fastened, may be occupied by occupant and placed on back seat of vehicle 18, as in such cases mainly probability of forgetting occupant to be removed from vehicle 18 by attendant is highest. Alternatively, carseat 20 occupied by occupant may be placed on front seat of vehicle 18. In an embodiment, occupant in vehicle 18 may be a toddler, an infant, a young child who requires supervision. At step 54, switch circuit 14 may be activated in electronic seat pad device 12, upon detection of pressure level. In an embodiment, switch circuit 44 may be activated once pressure level exceeds threshold pressure level.

At step 56, it may be checked whether battery level of control device 16 is sufficient. In an embodiment, when battery level of control device 16 is not sufficient, i.e. less than a threshold power level, low battery indicator beeper is activated and control passes to step 58. In another embodiment, when battery level of control device 16 is sufficient, i.e. exceeds threshold power level, control passes to step 60.

At step 58, battery of control device 16 may be charged to a level that exceeds threshold power level. At step 60, control device 16 may generate audio signals upon activation of switch circuit 14 even when vehicle engine is turned off, and radio system and air conditioning system are deactivated resultantly. Such generation of audio signals, despite vehicle engine being turned off, and radio system and air conditioning system being deactivated resultantly, indicate presence of occupant in vehicle 18.

At step 62, one or more audio devices, such as audio speaker 32, may enhance audio signals generated by control device 16. Enhanced audio signals are amplified signals having improved sound quality. At step 62, switch circuit 14 may be deactivated when carseat 20 is vacated by occupant in vehicle 18. In such a case, upon receiving indication of presence of occupant in vehicle 18, attendant may remove occupant from vehicle 18. Consequently, pressure level falls below threshold pressure level and switch circuit 14 may be deactivated.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic seat pad system, comprising:
an electronic seat pad device;
a battery;
one or more sensors configured to detect a pressure level exerted on a car seat in a vehicle when an occupant is seated on said car seat, wherein said electronic seat pad device is positioned on top of a bottom car seat cushion;
a switch circuit configured to be activated upon detection of said pressure level;
a control device, communicably coupled with said switch circuit, said control device is activated when said switch circuit is activated;
said control device provides a continuous audio signal as long as pressure is detected by said one or more sensors, even when a vehicle engine is turned off and a radio and air conditioning systems are deactivated, thereby indicating a presence of said occupant in the vehicle;
a volume knob mounted on said electronic seat pad device to adjust a loudness of said continuous audio signal; and
said battery only for powering said control device.

2. The electronic seat pad system of claim 1, wherein said control device is secured at a first location in said vehicle using a securing mechanism, wherein said first location is a back side of a front seat, wherein said securing mechanism comprises of straps and buckle.

3. The electronic seat pad system of claim 1, wherein said control device remains activated at all timestamps even when said vehicle engine turns off and resultantly, radio system and air conditioning system is deactivated in said vehicle.

4. The electronic seat pad system of claim 1, wherein said control device has a low battery indicator beeper which activates when battery level of said control device is less than a threshold power level.

5. The electronic seat pad system of claim 1, further comprising a hole located at a front portion of said electronic seat pad device through which a front single middle part of a seat buckle of said car seat engages with a receiving part located at a front base of said car seat.

6. The electronic seat pad system of claim 5, wherein said engagement of said front single middle part of said seat buckle of said car seat with said receiving part located at said front base of said car seat through said hole secures said electronic seat pad device on the top of the bottom car seat cushion.

7. The electronic seat pad system of claim 1, wherein a communicable coupling between said electronic seat pad device and said control device is based on a wired network or a wireless network.

8. The electronic seat pad system of claim 5, wherein said switch circuit is deactivated when said car seat is vacated by said occupant in said vehicle.

9. The electronic seat pad system of claim 5, wherein said car seat occupied by said occupant is in a back seat or front seat of said vehicle, wherein said occupant in said vehicle is an infant, a toddler, a young child, or an occupant who needs supervision.

* * * * *